(12) United States Patent
Li et al.

(10) Patent No.: US 11,477,003 B2
(45) Date of Patent: Oct. 18, 2022

(54) DEVICE SYNCHRONIZATION METHOD AND APPARATUS, DEVICE, AND STORAGE MEDIUM

(71) Applicant: Keenon Robotics Co., Ltd., Shanghai (CN)

(72) Inventors: Yingxuan Li, Shanghai (CN); Wei Xu, Shanghai (CN); Yayun Yang, Shanghai (CN)

(73) Assignee: Keenon Robotics Co., Ltd., Shanghai (CN)

( * ) Notice: Subject to any disclaimer, the term of this patent is extended or adjusted under 35 U.S.C. 154(b) by 0 days.

(21) Appl. No.: 17/185,712

(22) Filed: Feb. 25, 2021

(65) Prior Publication Data

US 2022/0069972 A1 Mar. 3, 2022

(30) Foreign Application Priority Data

Sep. 2, 2020 (CN) .......................... 202010906739.4

(51) Int. Cl.
*H04L 7/00* (2006.01)

(52) U.S. Cl.
CPC .......... *H04L 7/0054* (2013.01); *H04L 7/0091* (2013.01)

(58) Field of Classification Search
CPC ............................ H04L 7/0054; H04L 7/0091
See application file for complete search history.

(56) References Cited

U.S. PATENT DOCUMENTS 6,636,897 B1 * 10/2003 Sherman ................. G06F 16/27
709/248

FOREIGN PATENT DOCUMENTS

| CN | 104798069 A | 7/2015 |
|----|-------------|--------|
| CN | 108401168 A | 8/2018 |
| CN | 108650296 A | 10/2018 |
| CN | 111447567 A | 7/2020 |

* cited by examiner

*Primary Examiner* — Duc C Ho
(74) *Attorney, Agent, or Firm* — Klarquist Sparkman, LLP

(57) ABSTRACT

Provided are a device synchronization method and apparatus, a device, and a storage medium. The device synchronization method includes: in response to determining that a second device does not receive a first data packet, determining a target time cycle for sending data packets by the second device based on a preset cycle adjustment parameter and a preset time slice length; determining whether the second device receives a second data packet sent by the first device based on the time slice length and the target time cycle of the second device; and in response to determining that the second device receives the second data packet sent by the first device, determining a time point for sending a data packet next time by the second device according to data packet information of the first device, achieving cycle synchronization of the second device in a preset synchronization cycle time period.

20 Claims, 3 Drawing Sheets

DEVICE SYNCHRONIZATION METHOD AND APPARATUS, DEVICE, AND STORAGE MEDIUM

CROSS-REFERENCE TO RELATED APPLICATIONS

This application claims the priority of China patent application No. 202010906739.4 filed on Sep. 2, 2020, disclosure of which is hereby incorporated by reference in its entirety.

TECHNICAL FIELD

Embodiments of the present disclosure relate to communication technologies and, in particular, to a device synchronization method and apparatus, a device, and a storage medium.

BACKGROUND

With the development of communication technologies, the amounts of data transmission are constantly increasing, and multiple devices may send data packets concurrently. A device may either be in a sending mode or a receiving mode at a time. If multiple devices send data at the same time, then these sending devices will not be able to receive data sent by other devices, and it is difficult for a receiving device to receive intact data from any sender due to the mutual data interference, resulting in data loss.

In the related art, before sending data, the device may first detect whether there is data sent by other devices in a channel, so as to avoid data loss. If there is data, the device does not send data at this point. Then, the device randomly waits for a period of time and tries again, that is, the device does not send data until there is no data.

However, when there are multiple devices, they may detect that an air channel is idle at the same time, and then send data at the same time, thus resulting in data packet loss. Furthermore, when there are many devices, a certain device may wait all the time if it detects that the channel is busy before it is to send a data packet each time. In this way, the sending timeliness cannot be guaranteed, and the accuracy and efficiency of data transmission are low.

SUMMARY

Embodiments of the present disclosure provide a device synchronization method and apparatus, a device, and a storage medium, so as to improve the accuracy and efficiency of data transmission.

In a first aspect, an embodiment of the present disclosure provides a device synchronization method. The method includes the following operations.

In response to determining, within a preset time period, that a second device does not receive a first data packet sent by a first device, a target time cycle for sending data packets by the second device is determined according to a preset cycle adjustment parameter and a preset time slice length for sending a data packet.

It is determined, according to the time slice length for sending the data packet and the target time cycle of the second device, whether the second device receives a second data packet sent by the first device.

If it is determined that the second device receives the second data packet sent by the first device, a time point for sending a data packet next time by the second device is determined according to data packet information of the first device, so as to complete cycle synchronization of the second device in a preset synchronization cycle time period.

In a second aspect, an embodiment of the present disclosure further provides a device synchronization apparatus. The apparatus includes a target cycle determination module, a data packet receiving module and a device synchronization module.

The target cycle determination module is configured to, in response to determining, within a preset time period, that a second device does not receive a first data packet sent by a first device, determine, according to a preset cycle adjustment parameter and a preset time slice length for sending a data packet, a target time cycle for sending data packets by the second device.

The data packet receiving module is configured to determine, according to the time slice length for sending the data packet and the target time cycle of the second device, whether the second device receives a second data packet sent by the first device.

The device synchronization module is configured to, if the second device receives the second data packet sent by the first device, determine, according to data packet information of the first device, a time point for sending a data packet next time by the second device, so as to achieve cycle synchronization of the second device within a preset synchronization cycle time period.

In a third aspect, an embodiment of the present disclosure further provides a computer device. The computer device includes a memory, a processor, and a computer program stored in the memory and executable by the processor. The processor, when executing the program, implements the device synchronization method of any embodiment of the present disclosure.

In a fourth aspect, an embodiment of the present disclosure further provides a storage medium including computer-executable instructions. The computer-executable instructions, when executed by a computer processor, implement the device synchronization method of any embodiment of the present disclosure.

According to the embodiments of the present disclosure, when it is determined that the second device does not receive the first data packet sent by the first device, a time cycle for sending data by the second device is adjusted to obtain the target time cycle, and then, it is determined whether data sent by the second device according to the target time cycle collides with data normally sent by the first device. If there is no collision, it indicates that the second device is able to receive the data from the first device, and the second device adjusts the cycle of the second device according to the received data, so that the second device sends data packets according to the synchronization cycle. This solves the data loss problem in the related art that is caused by data collision due to unsynchronized cycles when multiple devices send data, thereby improving the accuracy and efficiency of data transmission.

DETAILED DESCRIPTION

Figure 1:
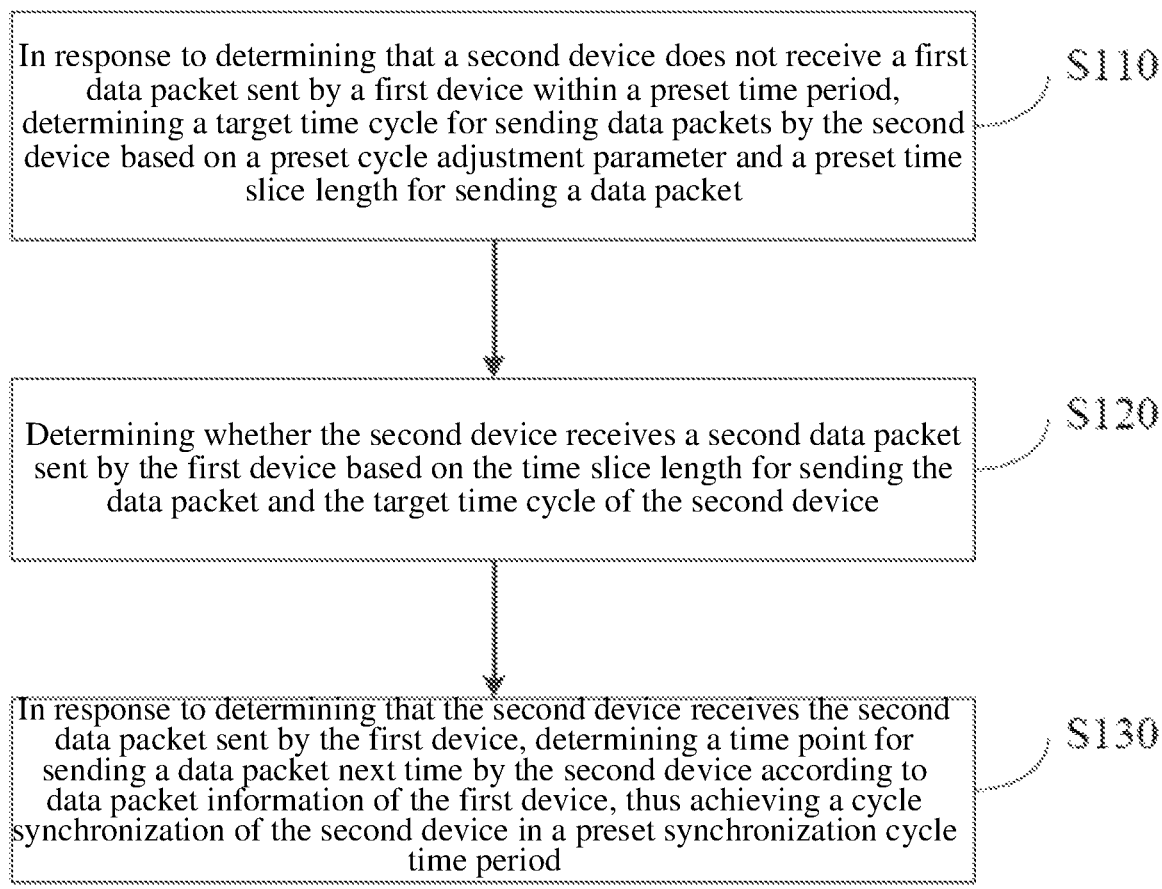
FIG. 1 is a flowchart of a device synchronization method according to a first embodiment of the present disclosure.

The present disclosure is further described below in detail in conjunction with drawings and embodiments. It is to be understood that the embodiments described herein are merely intended to explain the present disclosure and are not to limit the present disclosure. Additionally, it is to be noted that for easy of description, only the part related to the present disclosure, instead of all, is illustrated in the drawings.

First Embodiment

FIG. 1 is a flowchart of a device synchronization method according to a first embodiment of the present disclosure. This embodiment is applied to device cycle synchronization when multiple devices transmit data. The method may be performed by a device synchronization apparatus.

Before device synchronization, a resolution model of device synchronization is established as below.

Initially, when devices start to operate, it is assumed that a first data packet from a device numbered K and a first data packet from a device numbered K+1 are sent in collision, so a data sending cycle of the device numbered K+1 is adjusted. The device numbered K sends the first data packet at a time starting point $T_1$. The device numbered K+1 sends the first data packet at a time starting point $T_2$.

The adjusted data sending cycle of the device numbered K+1, that is, a target time cycle $T_{c2}$ of the device numbered K+1 is calculated according to a preset rule and a set cycle adjustment parameter.

A time starting point $T_1+T_{c1}$ for sending a second data packet by the device numbered K is calculated. $T_{c1}$ denotes a target time cycle of the device numbered K. A time starting point $T_2+T_{c2}$ for sending a second data packet by the device numbered K+1 is calculated. Then, it is determined whether the second data packet from the device numbered K collides with the second data packet from the device numbered K+1. That is, it is determined whether $T_1+T_{c1}+T_e$ overlaps $T_2+T_{c2}+T_e$. $T_e$ denotes a fixed time period required for sending a data packet by each device.

If there is collision, a time for sending a third data packet is calculated. A time point $T_1+2T_{c1}$ for sending a third data packet by the device numbered K is calculated. A time point $T_2+2T_{c2}$ for sending a third data packet by the device numbered K+1 is calculated. Then, it is determined again whether there is collision.

If there is no collision, the device numbered K+1 calculates, according to the received data packet from the device numbered K, a time point for a next data packet from the device numbered K+1, and performs cycle synchronization to finally implement synchronization of the device numbered K+1. Moreover, if a data packet from the device numbered K is successfully sent, it is indicated that all operating devices other than the device numbered K receive the data packet from the device numbered K. That is, all operating devices other than the device numbered K are successfully synchronized.

According to the model, an interval cycle parameter is set, a non-collision time point is obtained after collision comparison, thereby implementing the device synchronization. Therefore, the above model is reasonable and reliable.

The above model is recorded into the device in the form of coding, thereby completing synchronization operations in a scenario where multiple devices operate. Since the device sends data packets at startup according to a target time cycle corresponding to a device number, if the device successfully receives a data packet from another device, the device completes synchronization; if the device does not successfully receive the data packet, the device waits to send a second data packet according to the target time cycle. Until the device successfully receives a data packet, it is indicated that the device synchronization is successful, and the target time cycle is changed to a synchronization cycle.

As illustrated in FIG. 1, a device synchronization method specifically includes the steps described below.

In step S110, in response to determining, within a preset time period, that a second device does not receive a first data packet sent by a first device, a target time cycle for sending data packets by the second device is determined according to a preset cycle adjustment parameter and a preset time slice length for sending a data packet.

Both the first device and the second device may be configured to send data and receive data. The first device and the second device are numbered. In this embodiment, the number of the first device and the number of the second device are not limited. For example, the first device is numbered k and the second device is numbered k+1. A time period required for sending a complete data packet by the first device may be determined according to the length of a data packet sent by the first device. A time period required for sending a complete data packet by the second device may be determined according to the length of a data packet sent by the second device. In a synchronization state, the first device and the second device send data packets according to a preset synchronization cycle. The first device and the second device may be preconfigured to send data packets in sequence. The second device sends a data packet after the first device ends a time cycle, so as to preventing data sent by the first device colliding with data sent by the second device. If the first device and the second device are not synchronized, the second device may send data while the first device sends data. A data packet sent by the first device and a data packet sent by the second device may collide in the current channel, and thus, the device receiving data may not be able to receive a complete data packet, resulting in data loss.

A device number and a synchronization rule of cycle synchronization are pre-stored in each device. For example, the preset synchronization rule of the cycle synchronization is that various devices send data packets according to a device numbering sequence. In response to determining, within a preset time period, that the second device does not receive the first data packet sent by the first device, it is indicated that the first device and the second device are not synchronized, and a time slice length for sending a data packet by the second device may be adjusted according to the preset time slice length for sending the data packet. A time cycle obtained by the second device after the time slice length for sending the data packet is adjusted is a target time cycle. An ending time of the target time cycle is a starting time for sending a second data packet by the second device. A first data packet is a first packet of data sent by a device. A second data packet is a second packet of data sent by the same device. The target time cycle for sending data packets by the second device is determined according to the preset cycle adjustment parameter and the initially preset time slice length for sending the data packet. The preset cycle adjustment parameter is a predetermined constant and may be used for calculating the target time cycle of the second device to obtain a time for sending the second data packet by the second device.

In this embodiment, optionally, devices are uniform in time slice length for sending a data packet. The time slice length for sending the data packet includes a preset redundant time period and a time period required for completely sending a fixed-length data packet by the device.

In particular, the data packet sent by each device may be the fixed-length data packet. That is, devices are uniform in time period required for completely sending a fixed-length data packet. If the same redundant time period is preset, devices are uniform in time slice length for sending a data packet, and the first device and the second device are uniform in time for sending a first data packet. When the first data packet from the first device collides with the first data packet from the second device, an interval time period for sending the next data packet by the second device may be appropriately adjusted. The configuration of uniform times for sending data packets helps determine a data packet sending rule for each device, thereby improving the efficiency for sending data packets.

In this embodiment, optionally, the method further includes that: in response to determining that the second device receives the first data packet sent by the first device, the time point for sending the data packet next time by the second device is determined according to data packet information of the first data packet sent by the first device, so as to complete the cycle synchronization of the second device within the preset synchronization cycle time period.

In particular, if the first data packet sent by the first device and the first data packet sent by the second device do not collide in the current channel, it is indicated that the second device is in a state for receiving a data packet while the first device sends a data packet. Since the second device does not send data, the second device may completely receive the first data packet from the first device. After the second device receives the first data packet from the first device, the data packet information of the first device may be acquired. The data packet information may include specific content of the data packet, the time slice length for sending the data packet, a starting time for sending the data packet, an ending time for sending the data packet, and the like. According to the data packet information of the first device, the target time cycle of the second device is adjusted, a time interval between two data packet sendings of the second device is determined, and the time for sending the data packet next time by the second device is obtained. In this case, the target time cycle of the second device is a data packet sending cycle of the second device specified within the preset synchronization cycle. For example, the preset synchronization cycle indicates that the first device and the second device send data packets in sequence according to a time length of 1 hour. That is, the second device sends the first data packet from the second device 1 hour after the first device sends the first data packet. According to the determined synchronization cycle, the first device sends a second data packet after the second device ends sending the first data packet. This avoids data packet collision between the first device and the second device, implementing the cycle synchronization of the second device within the preset synchronization cycle time period. Such a configuration has the following beneficial effect: when a data packet sending of the first device for the first time does not collides with a data packet sending of the second device for the first time, the second device can completely receive the data packet sent by the first device, so that the second device implements the cycle synchronization, thereby avoiding data packet loss and improving the efficiency and accuracy of data transmission.

In this embodiment, optionally, the step in which the target time cycle for sending data packets by the second device is determined according to the preset cycle adjustment parameter and the preset time slice length for sending the data packet includes that the target time cycle for sending data packets by the second device is calculated according to the formulas described below.

If $$N_{max} - 1 = \alpha \times n, N = \left[\frac{N_{max} - 1}{\alpha}\right].$$

If $$N_{max} - 1 \neq \alpha \times n, N = \left[\frac{N_{max} - 1}{\alpha}\right].$$

$$T_{cn} = \left[\frac{ID}{N} + 1\right].$$

$$T_c = (N_{max} \times T_{cn} + (ID \ \%N + 1) \times \alpha) \times T_e.$$

$N_{max}$ denotes the current maximum number of devices. $\alpha$ denotes the preset cycle adjustment parameter greater than 1 and less than 2. n is an arbitrary integer. N denotes an intermediate calculation parameter. $T_{cn}$ denotes an integer part of the target time cycle. ID denotes a device number of the second device. $T_c$ denotes the target time cycle. $T_e$ denotes the time slice length for sending the data packet.

In particular, in the case where the first data packet from the first device collides with the first data packet from the second device, for the purpose of preventing the second data packet from the first device from colliding with the second data packet from the second device, it is necessary to adjust the starting time for sending the second data packet by the second device, so that the time for sending the second data packet by the second device is after a time for sending the second data packet by the first device, thus preventing the second data packet from the first device from colliding with the second data packet from the second device. Since when sending first data packets, the first device and the second device are uniform in time slice length for sending a data packet, the starting time for sending the second data packet by the second device may be prolonged. The target time cycle for sending data packets by the second device may be calculated according to the preset cycle adjustment parameter and the preset time slice length for sending the data packet by the first device. The target time cycle is a time period from sending the first data packet to sending the second data packet by the second device. The target time cycle is longer than a data packet sending cycle of the first device. The target time cycle for sending data packets by the second device may be calculated according to the formulas described below.

If $$N_{max} - 1 = \alpha \times n, N = \left[\frac{N_{max} - 1}{\alpha}\right].$$

If $$N_{max} - 1 \neq \alpha \times n, N = \left[\frac{N_{max} - 1}{\alpha}\right].$$

$$T_{cn} = \left[\frac{ID}{N} + 1\right].$$

$$T_c = (N_{max} \times T_{cn} + (ID \% N + 1) \times \alpha) \times T_e.$$

$N_{max}$ denotes the current maximum number of devices and is an integer. α denotes the preset cycle adjustment parameter greater than 1 and less than 2. n is an arbitrary integer. N denotes an intermediate calculation parameter and is an integer. $T_{cn}$ denotes an integer part of the target time cycle and is an integer. ID denotes a device number of the second device. $T_c$ denotes the target time cycle. $T_e$ denotes the time slice length for sending the data packet.

For example, the cycle adjustment parameter may be preset to 1.5, and it is determined whether the current maximum number of devices minus 1 is an integer multiple of 1.5. The current maximum number of devices minus 1 is substituted into a matching formula to obtain the intermediate calculation parameter N. N indicates the allowed number of unsynchronized devices within a time period of $T_c$. Then, the integer part of the target time cycle is calculated according to the device number of the second device. Finally, the target time cycle is obtained according to the current maximum number of devices, the integer part of the target time cycle, the time slice length for sending the data packet, and a remainder of the device number of the second device divided by the intermediate calculation parameter. In this way, in the case where the preset cycle adjustment parameter is 1.5, synchronization may be completed after the second device sends no more than two data packets according to the target time cycle. Such a configuration has the following beneficial effect: the target time cycle of the second device is obtained through the preset cycle adjustment parameter, so that the time for sending the second data packet by the second device is delayed, and the second data packet from the first device is effectively prevented from colliding with the second data packet from the second device, thereby improving the efficiency of device synchronization.

In this embodiment, optionally, after the step in which the target time cycle for sending data packets by the second device is determined according to the preset cycle adjustment parameter and the time slice length for sending the data packet, the method further includes: it is determined whether the current time reaches the time for sending a data packet by the second device. If yes, it is determined that the second device sends a data packet, and it is continuously determined whether the second device receives the second data packet sent by the first device, so as to complete the cycle synchronization of the second device within the preset synchronization cycle time period.

In particular, if the second device does not receive the first data packet from the first device, it is necessary to calculate the target time cycle and continue synchronization operations. After the target time cycle is determined, the time for sending the data packet next time by the second device is determined. Then, it is determined whether the current time reaches the time for sending the data packet next time by the second device. If the current time reaches the time, the second device sends a data packet, and it is continuously determined whether the second device can receive the second data packet from the first device. Synchronization operations of the second device are continued according to the reception result.

In step S120, it is determined, according to the target time cycle of the second device and the time slice length for sending the data packet, whether the second device receives the second data packet sent by the first device.

After the target time cycle of the second device is determined, it is detected whether there is data packet collision in the current channel when the first device sends the second data packet and the second device sends the second data packet.

The time slice length for sending the data packet by the first device is the time length for completing a data packet sending once by the first device. The time slice length for sending the data packet by the first device includes the time period for sending the complete data packet and the redundant time period after sending the complete data packet. The starting time for sending the second data packet by the first device may be obtained according to the time slice length for sending the data packet by the first device. The target time cycle of the second device is the time length from the starting time for sending the first data packet by the second device to the starting time for sending the second data packet by the second device. For example, there are two devices, device 1 and device 2, device 1 is the first device, and device 2 is the second device. Device 1 and device 2 send data packets in sequence according to a numbering sequence. The target time cycle of device 2 is the minimum interval time period between for sending two data packets. The starting time for sending the second data packet by the second device may be obtained according to the target time cycle of the second device. The channel is detected when the first device sends the second data packet and the second device sends the second data packet, so as to determine whether the second data packet sent by the first device collides with the second data packet sent by the second device, that is, to obtain whether the second device can receive the second data packet from the first device. Such a configuration has the following beneficial effect: the time for sending the second data packet by the first device and the time for sending the second data packet by the second device may be determined, so as to detect the data packet collision, thereby improving the collision detection efficiency and further improving the efficiency of device synchronization.

In the synchronization process of the second device, if a third device sends a data packet in a common redundant time period of the first device and the second device, then the data packet from the third device does not collide with data packets from the first device and the second device, and the first device and the second device may receive the data packet from the third device. If the third device sends a data packet within a time period required for completely sending fixed-length data packets by the first device and the second device, that is, first data packets from the first device, the second device and the third device collide with each other, then second data packets from the first device, the second device and the third device also collide with each other.

If the second device still cannot receive the second data packet from the first device, then it is indicated that the second device cannot implement synchronization, and a time for sending a third data packet by the second device needs to be determined according to the target time cycle. According to the time slice length for sending the data packet by the first device, a starting time for sending a third data packet by the first device may be obtained to detect whether the third data packet from the first device collide with the third data packet from the second device. If there is still collision, a time for sending the next data packet by the second device may be continuously calculated until a data packet sent by the first device does not collide with a data packet sent by the second device. By setting an appropriate cycle adjustment parameter, the second device may implement device synchronization after a first adjustment, thereby avoiding data packet collision. Such a configuration has the following beneficial effect: through data packets collision detection and continuously calculation, it can be ensured that a data packet sent by the first device does not collide with a data packet sent by the second device, and synchronization of the second device is ensured, thereby improving the efficiency of device synchronization and further improving the efficiency and accuracy of data transmission.

In step S130, if yes, a time point for sending a data packet next time by the second device is determined according to data packet information of the first device, so as to complete cycle synchronization of the second device within a preset synchronization cycle time period.

If it is determined that the second data packet sent by the first device does not collide with the second data packet sent by the second device, then it is indicated that the second device may completely receive the second data packet from the first device. The second device may determine, according to the received data packet information, the device number of the first device and the starting time for sending the data packet and the ending time for sending the data packet. The time point for sending the data packet next time by the second device within the synchronization cycle is determined according to the data packet information in the first device and the device number of the second device. After obtaining the time point for sending the data packet next time, the second device starts, according to the preset time slice length for sending the data packet, sending the data packet at the time point for sending the data packet next time, so that the second device sends the data packet at the time for sending the data packet by the second device within the preset synchronization cycle, thereby completing cycle synchronization of the second device.

In this embodiment, optionally, the step in which the time point for sending the data packet next time by the second device is determined according to the data packet information of the first device, so as to complete the cycle synchronization of the second device within the preset synchronization cycle time period includes that: an ending time point for sending the second data packet by the first device is determined according to data packet information of the second data packet sent by the first device and received by the second device, and the time point for sending the second data packet next time by the second device is determined according to the ending time point for sending the second data packet by the first device, so as to implement the cycle synchronization of the second device within the preset synchronization cycle time period.

In particular, the second device receives the second data packet from the first device, and the starting time for sending the second data packet by the first device and the ending time for sending the second data packet by the first device are determined according to the data packet information. A starting time for sending the second data packet next time by the second device may be determined according to a data packet sending rule and the ending time point for sending the second data packet by the first device. It is impossible that the second data packet from the second device collides with the second data packet from the first device at this time point. The first device and the second device are uniform in time slice length for sending a data packet. The first device and the second device are also uniform in time interval between two data packet transmissions. A time interval between two data packet transmissions of the first device and a time interval between two data packet transmissions of the second device are data packet sending cycles uniform in time length, that is, synchronization cycles. The second device sends data packets according to the synchronization cycle instead of the target time cycle calculated when the first packet from the second device collides with the first data packet from the first device, implementing synchronization of the second device. Such a configuration has the following beneficial effect: the synchronization cycle of the second device is determined according to the data packet information of the first device, so that it can be ensured that the second device sends data packets according to a cycle synchronization rule, thereby avoiding data packet collision and improving the efficiency of data transmission.

According to the solution of this embodiment, in response to determining that the second device does not receive the first data packet sent by the first device, the cycle of the second device is adjusted to obtain the target time cycle, and then, it is determined whether data sent by the second device according to the target time cycle collides with data normally sent by the first device. If there is no collision, it is indicated that the second device can receive the data from the first device, and the second device adjusts the cycle of the second device according to the received data, thereby implementing cycle synchronization of the second device. This solves the data loss problem caused by data collision due to unsynchronized cycles when multiple devices send data in the related art. This also solves the low timeliness problem of data transmission in the related art caused by a phenomenon where when there is data transmission in a channel, other devices can only detect the channel state and wait for the channel to be idle to send data. In this way, the efficiency and accuracy of data transmission is improved.

Second Embodiment

Figure 2:
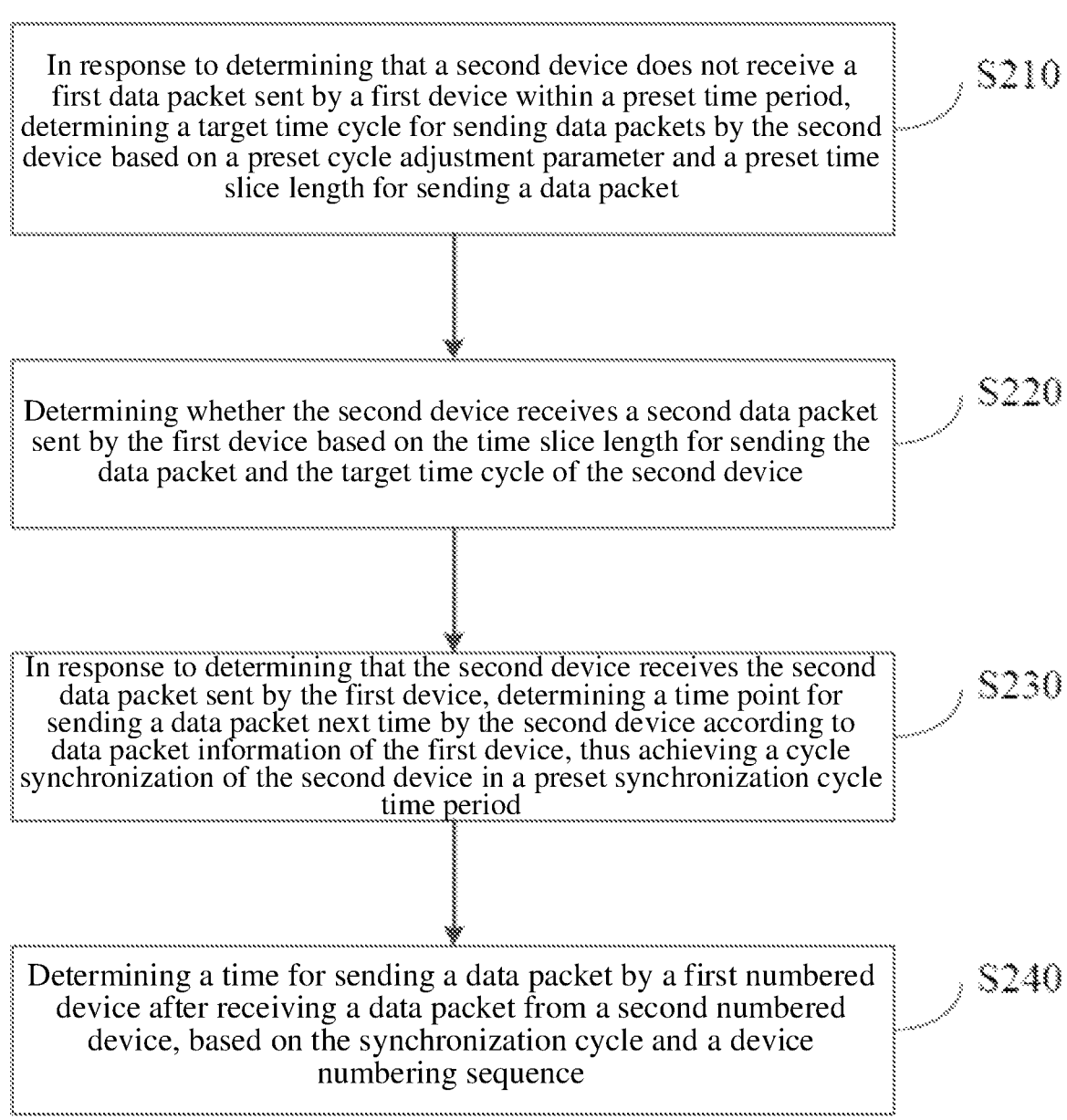
FIG. 2 is a flowchart of a device synchronization method according to a second embodiment of the present disclosure.

FIG. 2 is a flowchart of a device synchronization method according to a second embodiment of the present disclosure. This embodiment is further optimized on the basis of the preceding embodiment. The method may be performed by a device synchronization apparatus. As shown in FIG. 2, the method specifically includes the steps described below.

In step S210, in response to determining, within a preset time period, that a second device does not receive a first data packet sent by a first device, a target time cycle for sending data packets by the second device is determined according to a preset cycle adjustment parameter and a preset time slice length for sending a data packet.

Before the unsynchronized first device and the unsynchronized second device are adjusted to be synchronized devices, it is necessary to pre-process all devices and set a synchronization cycle rule for all devices, so that the synchronized devices send data packets according to the synchronization cycle rule.

In this embodiment, optionally, before the step in which the target time cycle for sending data packets by the second device is determined according to the preset cycle adjustment parameter and the preset time slice length for sending the data packet, the method further includes: a data packet sending rule corresponding to a device number and the synchronization cycle is determined according to a preset number of devices, the device number and a length of a data packet sent by a device. The data packet sent by the device is a fixed-length data packet.

In particular, the number of devices is pre-determined, devices are numbered, and the length of the data packet sent by the device is determined. The data packet sent by the device may be set to a fixed-length data packet. That is, devices are uniform in time period required for completely sending a fixed-length data packet. Then, a redundant time period is set. Redundant time periods may be uniform. A redundant time period of a device having a larger device number cannot be less than a redundant time period of a device having a smaller device number. According to the number of devices, the device number and the length of the data packet sent by the device, the synchronization cycle and the data packet sending rule of various devices are determined to instruct the various devices to send data in sequence according to a device numbering sequence. After the devices can exchange data packet information, the synchronization cycle, the data packet sending rule and other information may be extracted from the data packet information, so that the various devices send data according to the preset rule. This ensures that there is no data packet collision after device synchronization, thereby improving the efficiency and accuracy for sending and receiving data packets.

In step S220, it is determined, according to the target time cycle of the second device and the time slice length for sending the data packet, whether the second device receives a second data packet sent by the first device.

In step S230, if the second device receives the second data packet sent by the first device, a time point for sending a data packet next time by the second device is determined according to data packet information of the first device, thus achieving cycle synchronization of the second device within a preset synchronization cycle time period.

In this embodiment, optionally, after the step in which the time point for sending the data packet next time by the second device is determined so as to complete the cycle synchronization of the second device within the preset synchronization cycle time period, the method further includes: if the second device is disconnected, a synchronization state of the second device is switched to an asynchronization state according to a preset synchronization timeout mechanism, so as to perform synchronization again after the second device is online.

In particular, there may be disconnection after the device synchronization is completed. For example, the device is disconnected due to interference, shutdown or other factors. After the device is disconnected, the device cannot send data packets or receive data packets. The synchronization timeout mechanism is preset. If the device in the synchronization state does not send out data packets or receive data packets from other devices within a preset time period, then the device switches from the synchronization state to the asynchronization state. Synchronization operations are performed again after the device is online. Such a configuration has the beneficial effect of helping monitoring a device state in time and adjusting the device according to the device state. When it is found that the synchronization state of the device changes to the asynchronization state, the staff may exam the device so that the device can gets online for synchronization, thereby improving the efficiency of data packet transmission.

In step S240, a time for sending a data packet by a first numbered device after receiving a data packet from a second numbered device is determined according to the synchronization cycle and a device numbering sequence.

After the device synchronization is completed, in order for the various devices to orderly send data packets in sequence, it is necessary to calculate a starting time for sending a data packet by each device. When there are multiple devices, one device sends data and other devices may each receive the data. The first numbered device is a device receiving data. The second numbered device is a device sending data. For example, there are three devices numbered 001, 002 and 003. If device 001 sends data, devices 002 and 003 receive data. If device 002 sends data, devices 001 and 003 receive data. According to the device number of the first numbered device, the device number of the second numbered device, the time for receiving the data packet, the synchronization cycle and other information, the first numbered device may calculate a time for sending data next time by the first numbered device.

The time for sending the data packet by the first numbered device may be determined according to the formulas described below.

If $ID_2 > ID_1, t_1 = t_0 + (N_{max} + ID_1 - ID_2) \times T_e - T_s$.

If $ID_2 < ID_1, t_1 = t_0 + (ID_1 - ID_2) \times T_e - T_s$.

$ID_1$ denotes the device number of the first numbered device. $ID_2$ denotes the device number of the second numbered device. $t_1$ denotes the time for sending the data packet by the first numbered device. $t_0$ denotes a time for receiving a data packet from the second numbered device by the first numbered device. $T_e$ denotes the time slice length for sending the data packet. $T_s$ denotes the time period required for completely sending the fixed-length data packet. $T_s$ is less than or equal to $T_e$.

In particular, the device number of the first numbered device is compared with the device number of the second numbered device, and the device number of the first numbered device and the device number of the second numbered device are substituted into different calculation formulas according to the comparison result to calculate the time for sending the data packet next time by the first numbered device. $T_s$ is a part of $T_e$. $T_e$ may be composed of $T_s$ and $T_r$. $T_r$ denotes a redundant time period for sending data. Since the device sends the fixed-length data packet, the time length $T_s$ required for completely sending the data packet by each device is fixed. In view of a time period for switching between a receiving mode and a sending mode, the calculation performance of a processor and other time errors, the redundant time period is set, and the time slice length for sending the data packet satisfies that $T_e = T_s + T_r$. For example, there are three devices numbered 001, 002 and 003. $T_s$ is 1 second. $T_r$ is 1 second. If device 001 sends data packets, devices 002 and 003 receive the data packets at 12:00. Since numbers 002 and 003 are both greater than the number 001, it can be calculated that a time for sending a data packet by device 002 is at 12:01 and a time for sending a data packet by device 003 is at 12:03. If device 002 sends data packets, devices 001 and 003 receive the data packets at 12:00:02. Since number 001 is less than number 002 and number 003 is greater than number 002, it can be calculated, by using different formulas, that a time for sending a data packet next time by device 001 is at 12:00:05 and a time for sending a data packet next time by device 003 is at 12:00:03. According to the obtained results, it can be seen that the three devices may send data packets in sequence according to a numbering sequence, thereby avoiding data collision. Each device calculates a sending time each time receiving a data packet, so as to avoid the synchronization state loss caused by interference, shutdown or other factors during the operation of the device, thus helping monitoring the device state.

In this embodiment, optionally, the synchronization cycle is a time period required for completing data packet transmissions once by all devices in operation. The synchronization cycle is calculated according to the formula described below.

$$T_D = N_{max} \times T_e.$$

$T_D$ denotes the synchronization cycle.

In particular, in the case of multiple synchronized devices, the multiple synchronized devices are uniform in time slice length for sending a data packet. The synchronization cycle is a time period required for completing data packet transmissions once by all devices in operation, that is, a time interval between a data packet sending and a next data packet sending by a certain synchronization device. Thus, the synchronization cycle may be calculated according to the maximum number of devices and the time slice length for sending the data packet.

In this embodiment of the present disclosure, a synchronization timeout mechanism may be set. The synchronization timeout mechanism is that after data from a certain device is not received within a specific time period, the device is automatically switched to an asynchronization state so as to adjust the device to perform synchronization again. Before implementing device synchronization, the time period required for sending the complete fixed-length data packet by the device is determined firstly, and then, the theoretical time period is compared with an actual time period to obtain a more accurate time period for sending the complete fixed-length data packet. The more accurate the time period for sending the complete fixed-length data packet, the smaller the redundant time period may be set, so that time is used more efficiently, thereby improving the efficiency of device synchronization and the efficiency of data transmission.

According to this embodiment of the present disclosure, in response to determining that the second device does not receive the first data packet sent by the first device, a data sending time cycle of the second device is adjusted to obtain the target time cycle, and then, it is determined whether data sent by the second device according to the target time cycle collides with data normally sent by the first device. If there is no collision, it is indicated that the second device can receive the data from the first device, and the second device adjusts the cycle of the second device according to the received data, so that the second device sends data packets according to the synchronization cycle. This solves the data loss problem caused by data collision due to unsynchronized cycles when multiple devices send data in the related art. This also solves the low timeliness problem of data transmission in the related art caused by a phenomenon where when there is data transmission in a channel, other devices can only detect the channel state and wait for the channel to be idle to send data. After device synchronization, a time for sending data by each device is calculated in real time to ensure that various devices send data in sequence, and the state of each device is detected, thus effectively improving the efficiency and accuracy of data transmission.

Third Embodiment

Figure 3:
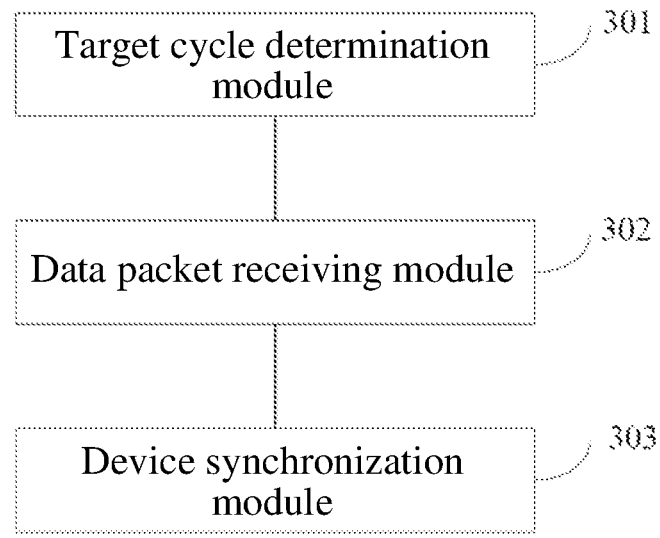
FIG. 3 is a block diagram of a device synchronization apparatus according to a third embodiment of the present disclosure.

FIG. 3 is a block diagram of a device synchronization apparatus according to a third embodiment of the present disclosure. The device synchronization apparatus may perform the device synchronization method provided by any embodiment of the present disclosure and has corresponding functional modules and beneficial effects for performing the method. As illustrated in FIG. 3, the apparatus specifically includes a target cycle determination module 301, a data packet receiving module 302 and a device synchronization module 303.

The target cycle determination module 301 is configured to, in response to determining, within a preset time period, that a second device does not receive a first data packet sent by a first device, determine, according to a preset cycle adjustment parameter and a preset time slice length for sending a data packet, a target time cycle for sending data packets by the second device.

The data packet receiving module 302 is configured to determine, according to the time slice length for sending the data packet and the target time cycle of the second device, whether the second device receives a second data packet sent by the first device.

The device synchronization module 303 is configured to, if the second device receives the second data packet sent by the first device, determine, according to data packet information of the first device, a time point for sending a data packet next time by the second device, so as to complete cycle synchronization of the second device within a preset synchronization cycle time period.

Optionally, the apparatus further includes a synchronization implementation module.

The synchronization implementation module is configured to, in response to determining that the second device receives the first data packet sent by the first device, determine, according to data packet information of the first data packet sent by the first device, the time point for sending the data packet next time by the second device, so as to complete the cycle synchronization of the second device within the preset synchronization cycle time period.

Optionally, the apparatus further includes a data packet sending module.

The data packet sending module is configured to determine whether a current time reaches a time for sending a data packet by the second device, if yes, determine that the second device sends a data packet, and continuing to determine whether the second device receives the second data packet sent by the first device, so as to complete the cycle synchronization of the second device in the preset synchronization cycle time period.

Optionally, the target cycle determination module 301 is specifically configured to perform the step described below.

The target time cycle for sending data packets by the second device is calculated according to formulas described below.

If $$N_{max} - 1 = \alpha \times n, N = \left[\frac{N_{max} - 1}{\alpha}\right].$$

If $$N_{max} - 1 \neq \alpha \times n, N = \left[\frac{N_{max} - 1}{\alpha}\right].$$

$$T_{cn} = \left[\frac{ID}{N} + 1\right].$$

$$T_c = (N_{max} \times T_{cn} + (ID \% N + 1) \times \alpha) \times T_e.$$

$N_{max}$ denotes the current maximum number of devices. $\alpha$ denotes the preset cycle adjustment parameter greater than 1 and less than 2. n is an arbitrary integer. N denotes an intermediate calculation parameter. $T_{cn}$ denotes an integer part of the target time cycle. ID denotes a device number of the second device. $T_c$ denotes the target time cycle. $T_e$ denotes the time slice length for sending the data packet.

Optionally, the preset cycle adjustment parameter is 1.5 so that the second device is operative to send no more than two data packets according to the target time cycle.

Optionally, the apparatus further includes a state switching module.

The state switching module is configured to, after the step in which the time point for sending the data packet next time by the second device is determined to complete the cycle synchronization of the second device within the preset synchronization cycle time period, if the second device is disconnected, switch a synchronization state of the second device to an asynchronization state according to a preset synchronization timeout mechanism, so as to perform synchronization again after the second device is online.

Optionally, the device synchronization module 303 is specifically configured to perform the steps described below.

A ending time point for sending the second data packet by the first device is determined according to data packet information of the second data packet sent by the first device and received by the second device.

The time point for sending the next data packet by the second device is determined according to the ending time point for sending the second data packet by the first device, so as to implement the cycle synchronization of the second device within the preset synchronization cycle time period.

Optionally, the apparatus further includes a sending time determination module.

The sending time determination module is configured to, after the step in which the time point for sending the data packet next time by the second device is determined according to the data packet information of the first device, so as to complete the cycle synchronization of the second device within the preset synchronization cycle time period, determine, according to the synchronization cycle and a device numbering sequence, a time for sending a data packet by a first numbered device after receiving a data packet from a second numbered device.

The time for sending the data packet by the first numbered device is determined according to the formulas described below.

If $ID_2 > ID_1$, $t_1 = t_0 + (N_{max} + ID_1 - ID_2) \times T_e - T_s$.

If $ID_2 < ID_1$, $t_1 = t_0 + (ID_1 - ID_2) \times T_e - T_s$.

$ID_1$ denotes the device number of the first numbered device. $ID_2$ denotes the device number of the second numbered device. $t_1$ denotes the time for sending the data packet by the first numbered device. $t_0$ denotes a time for receiving the data packet from the second numbered device by the first numbered device. $T_e$ denotes the time slice length for sending the data packet. $T_s$ denotes a time period required for completely sending a fixed-length data packet. $T_s$ is less than or equal to $T_e$.

Optionally, devices are uniform in time slice length for sending a data packet. The time slice length for sending the data packet includes a preset redundant time period and the time period for completely sending the fixed-length data packet by each device.

Optionally, the synchronization cycle is a time period required for completing data packet sendings once by all devices in operation.

The synchronization cycle is calculated according to the formula described below.

$T_D = N_{max} \times T_e$.

$T_D$ denotes the synchronization cycle.

Optionally, the apparatus further includes a rule setting module.

The rule setting module is configured to, before the step in which the target time cycle for sending data packets by the second device is determined according to the preset cycle adjustment parameter and the preset time slice length for sending the data packet, determine a data packet sending rule corresponding to a device number and the synchronization cycle according to a preset number of devices, the device number and a length of a data packet sent by a device. The data packet sent by the device is the fixed-length data packet.

According to this embodiment of the present disclosure, in response to determining that the second device does not receive the first data packet sent by the first device, a cycle of the second device is adjusted to obtain the target time cycle, and then, it is determined whether data sent by the second device according to the target time cycle collides with data normally sent by the first device. If there is no collision, it is indicated that the second device can receive the data from the first device, and the second device adjusts the cycle of the second device according to the received data, so that the second device sends data packets according to the synchronization cycle. This solves the data loss problem caused by data collision due to unsynchronized cycles when multiple devices send data in the related art. This also solves the low timeliness problem of data transmission in the related art caused by a phenomenon where when there is data transmission in a channel, other devices can only detect the channel state and wait for the channel to be idle to send data. In this way, the efficiency and accuracy of data transmission is improved.

Fourth Embodiment

Figure 4:
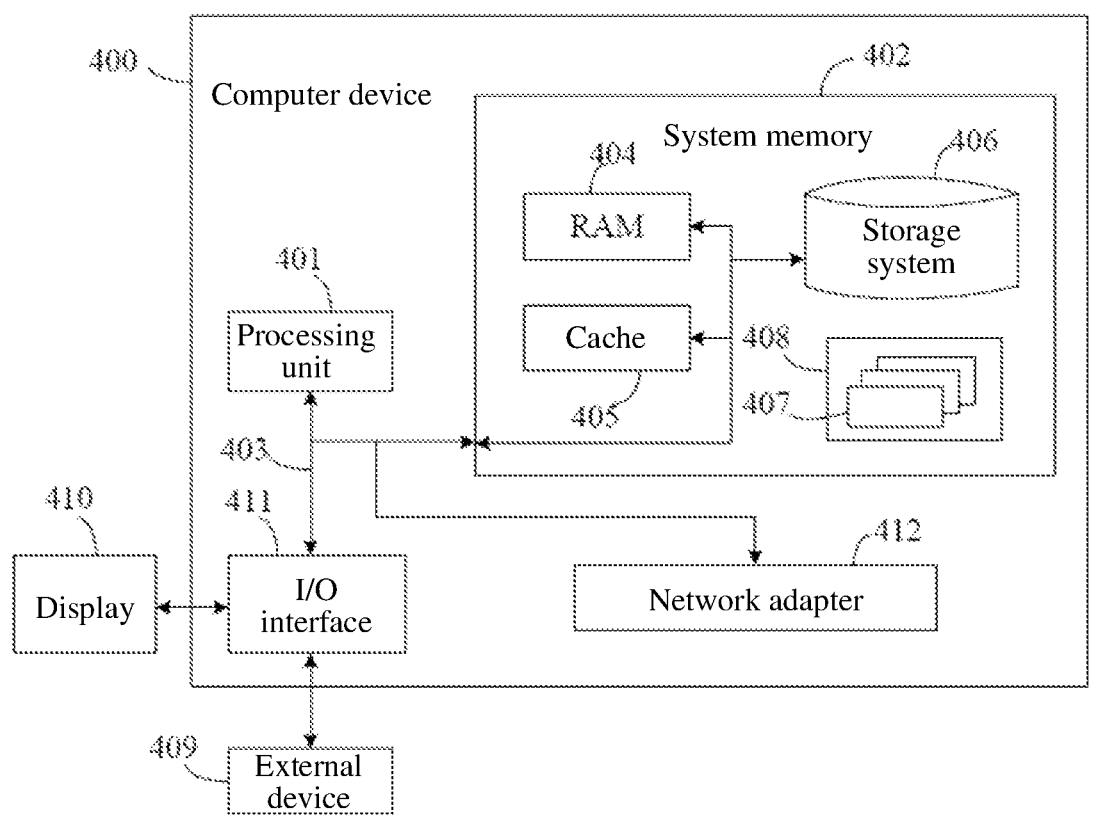
FIG. 4 is a schematic structural diagram of a computer device according to a fourth embodiment of the present disclosure.

FIG. 4 is a schematic structural diagram of a computer device according to a fourth embodiment of the present disclosure. FIG. 4 is a block diagram of an exemplary computer device 400 for implementing an embodiment of the present disclosure. The computer device 400 illustrated in FIG. 4 is merely an example and not intended to limit the function and use scope of the embodiment of the present disclosure.

As illustrated in FIG. 4, the computer device 400 may take a form of a general-purpose computer device. Components of the computer device 400 may include, but are not limited to, one or more processors or processing units 401, a system memory 402, and a bus 403 connecting different system components (including the system memory 402 and the one or more processing units 401).

The bus 403 represents one or more of several types of bus structures, including a memory bus or memory controller, a peripheral bus, an accelerated graphics port, and a processor or a local bus using any of a variety of bus architectures. For example, these architectures include, but are not limited to, an industry subversive alliance (ISA) bus, a micro channel architecture (MAC) bus, an enhanced ISA bus, a video electronics standards association (VESA) local bus and a peripheral component interconnect (PCI) bus.

The computer device 400 typically includes multiple computer system readable media. These media may be available media that can be accessed by the computer device 400, including volatile and non-volatile media, and removable and non-removable media.

The system memory 402 may include a computer system readable medium in the form of a volatile memory, such as a random access memory (RAM) 404 and/or a cache memory 405. The computer device 400 may further include other removable/non-removable and volatile/non-volatile computer system storage media. Just for example, a storage system 406 may be configured to perform reading and writing on a non-removable and non-volatile magnetic medium (not illustrated in FIG. 4 and usually referred to as a "hard disk driver"). Although not illustrated in FIG. 4, it is feasible to provide not only a magnetic disk driver for performing reading and writing on a removable non-volatile magnetic disk (for example, a "floppy disk"), but also an optical disk driver for performing reading and writing on a removable non-volatile optical disk (such as a CD-ROM, a DVD-ROM or other optical media). In such cases, each driver may be connected to the bus 403 via one or more data media interfaces. The memory 402 may include at least one program product having a group of program modules (for example, at least one program module). These program modules are configured to perform functions of various embodiments of the present disclosure.

A program/utility 408 having a group of program modules 407 (at least one program module 407) may be stored in, for example, the memory 402. Such program modules 407 include, but are not limited to, an operating system, one or more application programs, other program modules and program data. Each or some combination of these examples may include implementation of a network environment. The at least one program module 407 generally performs functions and/or methods described in the embodiments of the present disclosure.

The computer device 400 may communicate with one or more external devices 409 (such as a keyboard, a pointing terminal and a displayer 410). The computer device 400 may further communicate with one or more devices that enable a user to interact with the computer device 400, and/or with any device (such as a network card or a modem) that enables the computer device 400 to communicate with one or more other computing devices. Such communications may be performed through an input/output (I/O) interface 411. Moreover, the device 400 may communicate with one or more networks (such as a local area network (LAN), a wide area network (WAN) and/or a public network, for example, the Internet) through a network adapter 412. As shown in FIG. 4, the network adapter 412 communicates with other modules of the computer device 400 via the bus 403. It is to be understood that although not shown in FIG. 4, other hardware and/or software modules may be used in conjunction with the computer device 400. The other hardware and/or software modules include, but are not limited to, microcodes, a terminal driver, a redundant processing unit, an external disk drive array, an RAID system, a tape driver, a data backup storage system and the like.

The one or more processing units 401 execute a program stored in the system memory 402 to perform various functional applications and data processing, for example, to perform a device synchronization method provided by an embodiment of the present disclosure. The method includes the steps described below.

In response to determining, within a preset time period, that a second device does not receive a first data packet sent by a first device, a target time cycle for sending data packets by the second device is determined according to a preset cycle adjustment parameter and a preset time slice length for sending a data packet.

It is determined, according to the target time cycle of the second device and the time slice length for sending the data packet, whether the second device receives a second data packet sent by the first device.

If yes, a time point for sending a data packet next time by the second device is determined according to data packet information of the first device, so as to complete cycle synchronization of the second device within a preset synchronization cycle time period.

Fifth Embodiment

A fifth embodiment of the present disclosure further provides a storage medium including computer executable instructions. The storage medium stores a computer program. The program, when executed by a processor, implements the device synchronization method provided by an embodiment of the present disclosure. The method includes the steps described below.

In response to determining, within a preset time period, that a second device does not receive a first data packet sent by a first device, a target time cycle for sending data packets by the second device is determined according to a preset cycle adjustment parameter and a preset time slice length for sending a data packet.

It is determined, according to the target time cycle of the second device and the time slice length for sending the data packet, whether the second device receives a second data packet sent by the first device.

If the second device receives the second data packet sent by the first device, a time point for sending a data packet next time by the second device is determined according to data packet information of the first device, so as to complete cycle synchronization of the second device within a preset synchronization cycle time period.

The computer storage medium of this embodiment of the present disclosure may employ any combination of one or more computer-readable media. A computer-readable medium may be a computer-readable signal medium or a computer-readable storage medium. The computer-readable storage medium may be, but are not limited to, an electrical, magnetic, optical, electromagnetic, infrared or semiconductor system, apparatus or device, or any combination thereof. More specific examples of the computer-readable storage medium include (non-exhaustive list): an electrical connection having one or more wires, a portable computer magnetic disk, a hard disk, a random access memory (RAM), a read only memory (ROM), an erasable programmable read only memory (EPROM or flash memory), an optical fiber, a portable compact disk-read only memory (CD-ROM), an optical memory device, a magnetic memory device, or any appropriate combination thereof. In this application, the computer-readable storage medium may be any tangible medium including or storing a program. The program may be used by or used in conjunction with an instruction execution system, apparatus or device.

The computer-readable signal medium may include a data signal propagated in a baseband or as a part of a carrier. The data signal carries computer-readable program codes. Such a propagated data signal may be in multiple forms including, but not limited to, an electromagnetic signal, an optical signal or any appropriate combination thereof. The computer-readable signal medium may further be any computer-readable medium other than a computer-readable storage medium. The computer-readable medium may send, propagate or transmit the program used by or used in conjunction with the instruction execution system, apparatus or device.

Program codes included in the computer-readable medium may be transmitted via any appropriate medium. The medium includes, but is not limited to, the wireless, a wire, an optical cable, the RF or the like, or any appropriate combination thereof.

Computer program codes for performing the operations of the present application may be written in one or more programming languages or a combination thereof. The programming languages include object-oriented programming languages such as Java, Smalltalk, C++ and further include conventional procedural programming languages such as the C programming language or similar programming languages. The program codes may be executed entirely on a user computer, partly on the user computer, as a stand-alone software package, partly on the user computer and partly on a remote computer, or entirely on the remote computer or server. In the case relate to the remote computer, the remote computer may be connected to a user computer via any kind of network including a local area network (LAN) or a wide area network (WAN), or may be connected to an external computer (for example, via the Internet through an Internet service provider).

It is to be noted that the foregoing merely portrays some illustrative embodiments in accordance with the present disclosure and the principles used herein. It is to be understood by those skilled in the art that the present disclosure will not be limited to the embodiments disclosed herein. Those skilled in the art will be able to make various apparent changes, adaptations and substitutions without departing from the scope of the present disclosure. Therefore, while the present disclosure has been described in detail through the above embodiments, the present disclosure will not be limited to the foregoing embodiments and may include more other equivalent embodiments without departing from the concept of the present disclosure. The scope of the present disclosure is thus only defined in and by the appended claims.

What is claimed is:

1. A device synchronization method, comprising:
    in response to determining that a second device does not receive a first data packet sent by a first device within a preset time period, determining a target time cycle for sending data packets by the second device based on a preset cycle adjustment parameter and a preset time slice length for sending a data packet;
    determining whether the second device receives a second data packet sent by the first device based on the preset time slice length for sending the data packet and the target time cycle of the second device; and
    in response to determining that the second device receives the second data packet sent by the first device, determining a time point for sending a data packet next time by the second device according to data packet information of the first device, thus achieving a cycle synchronization of the second device in a preset synchronization cycle time period.

2. The device synchronization method of claim 1, further comprising:
    in response to determining that the second device receives the first data packet sent by the first device, determining the time point for sending the data packet next time by the second device according to data packet information of the first data packet sent by the first device thus achieving the cycle synchronization of the second device in the preset synchronization cycle time period.

3. The device synchronization method of claim 1, further comprising the following operation subsequent to determining the target time cycle for sending data packets by the second device based on the preset cycle adjustment parameter and the preset time slice length for sending a data packet:
    determining whether a current time reaches a time for sending a data packet by the second device, and in response to determining that the current time reaches the time for sending the data packet sent by the second device, determining that the second device sends a data packet, and continuing to determine whether the second device receives the second data packet sent by the first device, thus achieving the cycle synchronization of the second device in the preset synchronization cycle time period.

4. The device synchronization method of claim 1, wherein determining the target time cycle for sending data packets by the second device based on the preset cycle adjustment parameter and the preset time slice length comprises:
    calculating the target time cycle for sending data packets by the second device according to the following formulas:

$$N_{max} - 1 = \alpha \times n, N = \left[\frac{N_{max} - 1}{\alpha} - 1\right];$$

in a case where $$N_{max} - 1 \neq \alpha \times n, N = \left[\frac{N_{max} - 1}{\alpha}\right];$$

$$T_{cn} = \left[\frac{ID}{N} + 1\right]; \text{ and}$$

$$T_c = (N_{max} \times T_{cn} + (ID \% N + 1) \times \alpha) \times T_e,$$

in a case where
    where $N_{max}$, denotes a current maximum number of devices, $\alpha$ denotes the preset cycle adjustment parameter greater than 1 and less than 2, n is an arbitrary integer, N denotes an intermediate calculation parameter, $T_{en}$ denotes an integer part of the target time cycle, ID denotes a device number of the second device, $T_e$ denotes the target time cycle, and $T_e$ denotes the preset time slice length for sending the data packet.

5. The device synchronization method of claim 1, wherein the preset cycle adjustment parameter is 1.5 so that the second device sends no more than two data packets according to the target time cycle.

6. The device synchronization method of claim 1, further comprising the following operation subsequent to determining the time point for sending the data packet next time by the second device thus achieving the cycle synchronization of the second device in the present synchronization cycle time period:
    in a case where the second device is disconnected, switching a synchronization state of the second device to an asynchronization state according to a preset synchronization timeout mechanism, so as to perform synchronization again after the second device gets online.

7. The device synchronization method of claim 1, wherein determining the time point for sending the data packet next time by the second device according to the data packet information of the first device thus achieving the cycle synchronization of the second device in the preset synchronization cycle time period comprises:
- determining an ending time point for sending the second data packet by the first device according to the data packet information of the second data packet that is sent by the first device and received by the second device; and
- determining the time point for sending the next data packet by the second device according to the ending time point for sending the second data packet by the first device, thus achieving the cycle synchronization of the second device in the preset synchronization cycle time period.

8. The device synchronization method of claim 1, further comprising the following operations subsequent to determining the time point for sending the data packet next time by the second device according to the data packet information of the first device thus achieving the cycle synchronization of the second device in the present synchronization cycle time period:
- determining a time for sending a data packet by a first numbered device after receiving a data packet from a second numbered device, based on the synchronization cycle and a device numbering sequence; and
- determining the time for sending the data packet by the first numbered device according to the following formulas:
  in a case where $$ID_2 > ID_1 \ t_1 = t_o + (N_{max} + ID_1 - ID_2) \times - T_s.$$

in a case where $$ID_2 < ID \ t_1 = t_o + (ID_1 - ID_2) \times T_e - T_s$$

wherein $ID_1$ denotes a device number of the first numbered device, $ID_2$ denotes a device number of the second numbered device, $t_1$ denotes the time for sending the data packet by the first numbered device, $t_o$ denotes a time for receiving the data packet from the second numbered device by the first numbered device, $T_e$ denotes the preset time slice length for sending the data packet, $T_s$ denotes a time period required for totally sending a fixed-length data packet, and $T_s$ is less than or equal to $T_e$.

9. The device synchronization method of claim 1, wherein the preset time slice length for sending a data packet by each device is consistent, and the preset time slice length for sending the data packet comprises a time period required for totally sending a fixed-length data packet by a device and a preset redundant time period.

10. The device synchronization method of claim 1, wherein the synchronization cycle is a time period required for completing the sending of data packet sending once by all devices in operation; and
the synchronization cycle is calculated according to following formula: $T_D = N_{max} \times T_e$
wherein $T_D$ denotes the synchronization cycle.

11. The device synchronization method of claim 1, further comprising the following operation prior to determining the target time cycle for sending data packets by the second device based on the preset cycle adjustment parameter and the preset time slice length for sending the data packet:
- determining a synchronization cycle and a data packet sending rule corresponding to a device number based on a preset number of devices, the device number, and a length of a data packet sent by a device, wherein the data packet sent by the device is a fixed-length data packet.

12. A device synchronization apparatus, comprising:
- a target cycle determination module, configured for: in response to determining that a second device does not receive a first data packet sent by a first device within a preset time period, determining a target time cycle for sending data packets by the second device based on a preset cycle adjustment parameter and a preset time slice length for sending a data packet;
- a data packet receiving module, configured for: determining whether the second device receives a second data packet sent by the first device based on the preset time slice length for sending the data packet and the target time cycle of the second device; and
- a device synchronization module, configured for: in response to determining that the second device receives the second data packet sent by the first device, determining a time point for sending a data packet next time by the second device according to data packet information of the first device, thus achieving a cycle synchronization of the second device in a preset synchronization cycle time period.

13. The device synchronization apparatus of claim 12, further comprising:
- a synchronization implementation module, configured for: in response to determining that the second device receives the first data packet sent by the first device, determining the time point for sending the data packet next time by the second device according to data packet information of the first data packet sent by the first device thus achieving the cycle synchronization of the second device in the preset synchronization cycle time period.

14. The device synchronization apparatus of claim 12, further comprising:
- a data packet sending module, configured for determining whether a current time reaches a time for sending a data packet by the second device, and in response to determining that the current time reaches the time for sending the data packet by the second device, determining that the second device sends a data packet, and continuing to determine whether the second device receives the second data packet sent by the first device, thus achieving the cycle synchronization of the second device in the preset synchronization cycle time period.

15. The device synchronization apparatus of claim 12, wherein the target cycle determination module is configured for:
- calculating the target time cycle for sending data packets by the second device according to the following formulas:

$$N_{max} - 1 = \alpha \times n, N = \left[\frac{N_{max} - 1}{\alpha} - 1\right];$$

in a case where $$N_{max} - 1 \neq \alpha \times n, N = \left[\frac{N_{max} - 1}{\alpha}\right];$$

$$T_{cn} = \left[\frac{ID}{N} + 1\right]; \text{ and}$$

$$T_c = (N_{max} \times T_{cn} + (ID \ \% \ N + 1) \times \alpha) \times T_e,$$

in a case where where $N_{max}$, denotes a current maximum number of devices, a denotes the preset cycle adjustment parameter greater than 1 and less than 2, $n$ is an arbitrary integer, N denotes an intermediate calculation parameter, $T_{cn}$ denotes an integer part of the target time cycle, ID denotes a device number of the second device, $T_c$ denotes the target time cycle, and $T_e$ denotes the preset time slice length for sending the data packet.

16. The device synchronization apparatus of claim 12, wherein the preset cycle adjustment parameter 1.5 so that the second device sends no more than two data packets according to the target time cycle.

17. The device synchronization apparatus of claim 12, further comprising a state switching module, configured for performing the following operation subsequent to determining the time point for sending the data packet next time by the second device thus achieving the cycle synchronization of the second device in the present synchronization cycle time period:

in a case where the second device is disconnected, switch a synchronization state of the second device to an asynchronization state according to a preset synchronization timeout mechanism, so as to perform synchronization again after the second device is online.

18. The device synchronization apparatus of claim 12, wherein the device synchronization module is configured for:

determining an ending time point for sending the second data packet by the first device according to the data packet information of the second data packet that is sent by the first device and received by the second device; and determining the time point for sending the next data packet by the second device according to the ending time point for sending the second data packet by the first device, thus achieving the cycle synchronization of the second device in the preset synchronization cycle time period.

19. A computer device, comprising a memory, a processor and a computer program stored in the memory and executable by the processor, wherein the processor, when executing the computer program, performs the device synchronization method of claim 1.

20. A non-transitory storage medium comprising computer-executable instructions, wherein the computer-executable instructions, when executed by a computer processor, are configured to perform the device synchronization method of claim 1.

* * * * *